United States Patent
Saad

(10) Patent No.: US 11,985,055 B1
(45) Date of Patent: May 14, 2024

(54) DETERMINING HOP COUNT DISTRIBUTION IN A NETWORK

(71) Applicant: Amazon Technologies, Inc., Seattle, WA (US)

(72) Inventor: Sameh George Alphonse Saad, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 17/473,666

(22) Filed: Sep. 13, 2021

(51) Int. Cl.
| | |
|---|---|
| *H04L 45/12* | (2022.01) |
| *H04L 43/0888* | (2022.01) |
| *H04L 45/122* | (2022.01) |
| *H04L 47/28* | (2022.01) |

(52) U.S. Cl.
CPC ........ *H04L 45/123* (2013.01); *H04L 43/0888* (2013.01); *H04L 45/122* (2013.01); *H04L 47/286* (2013.01)

(58) Field of Classification Search
CPC . H04L 45/123; H04L 43/0888; H04L 45/122; H04L 47/286
USPC .......................................................... 709/224
See application file for complete search history.

(56) References Cited

U.S. PATENT DOCUMENTS

| | | | | |
|---|---|---|---|---|
| 2006/0092856 | A1* | 5/2006 | Mitsumori | H04L 12/437 370/254 |
| 2009/0154462 | A1* | 6/2009 | Tochio | H04L 49/3009 370/392 |
| 2011/0317566 | A1* | 12/2011 | Keeni | H04L 63/1425 370/252 |

FOREIGN PATENT DOCUMENTS

WO    WO 2019/137607    * 7/2019

* cited by examiner

*Primary Examiner* — Hermon Asres
(74) *Attorney, Agent, or Firm* — Klarquist Sparkman, LLP

(57) ABSTRACT

Hop counts can be determined in a variety of network segments using packet headers collected at boundaries of the segments. Agents executing on network devices are used to transmit packet header data, including a TTL budget, to a collector server computer. The collector server computer can discern signal (production flows) from noise (traceroutes and probing traffic), detecting packets that are at risk of being dropped due to TTL expiration. Alerts can be generated for packet flows with a dangerously low remaining TTL budget, which are at high risk of expiring due to operational events resulting in traffic temporarily traversing slightly longer paths. Source addresses can be identified for such packet flows and network devices through which the packet flows are traversing can be identified. Hop counts can then be computed for different network segments, such as an Internet segment, a backbone segment and a data center segment.

18 Claims, 10 Drawing Sheets

SOFTWARE 1080 IMPLEMENTING DESCRIBED TECHNOLOGIES

DETERMINING HOP COUNT DISTRIBUTION IN A NETWORK

BACKGROUND

Traffic on the Internet has grown dramatically over the last decade and continues to grow. Routers play a critical role in sustaining that growth. Data to be passed by routers is generally divided into a series of packets that can be transmitted between devices. Packets include control information and payload data. The control information corresponds to information used by a communication network to deliver the payload data. For example, control information can include source and destination network addresses, error detection codes, packet sequencing identification, and a time-to-live (TTL) parameter. Typically, control information is found in packet headers included within the packet and adjacent to the payload data.

Network routers can be used to forward data packets from a source computing device to a destination computing device in a computer network. In larger networks, a data packet may be routed through multiple routers before reaching its ultimate destination. When one router transmits a data packet to a neighboring router in the network, the transfer can be referred to as a "hop." When a router receives a data packet and identifies a neighboring router to which the data packet should be transmitted, it can be said to have identified a "next hop" for the data packet. At least some routers are configured to determine next hops for data packets using routing tables. A routing table can be used to determine associations between network address prefixes and next hops to which data packets matching the network address prefixes should be routed. Network routing protocols exist that enable routers to build routing tables and converge on a shared network topology. Example routing protocols include the Border Gateway Protocol (BGP), the Open Shortest Path First protocol (OSPF), and the Intermediate System to Intermediate System protocol (IS-IS).

Whatever protocol is used, the TTL parameter (also known in as Hop Limit in IPv6) ensures the network packet has a limited life span through the network. Each hop decrements the TTL parameter by 1, and a packet is discarded if the packet's TTL reaches a base value, such as 0. In this way, if a network packet is stuck in a loop, it will be discarded. The TTL is also used to prevent malicious packets from traversing a network's routers indefinitely and is an 8-bit value parameter with values ranging 0-255.

In large scale networks, path changes can lead to packets traversing a longer path with hop counts exceeding TTL values set on the source devices. As a result, packets are dropped and network connectivity is impaired. Due to the large-scale nature of those networks, determining the path changes responsible for the impairment can be challenging without mechanisms that map the end-to-end network hop count and changes thereof.

DETAILED DESCRIPTION

Network expansion (i.e., resulting in adding new hops to the network) can impact a number of packets dropped due to expiration of the TTL parameter. For example, if many packets with a nearly expired TTL are being received in a data center, then expansion of the data center (or any connect part of the network) can cause the packets to traverse extra hops, leading to a higher number of dropped packets. Logic that utilizes flow export protocols can be used to determine how network segments are consuming TTL budget for user flows, to determine a root cause of TTL impacting events, and to determine the network segment that changed, where applicable. The method reduces TTL troubleshooting time for impacting events from several hours to several minutes and can be used to drive design changes to reduce hop count and TTL impact.

In specific examples, a hop count can be determined for various network segments that is tracked as a function of time. For example, a hop count can be determined from a source computer, over the Internet, to a backbone network. Furthermore, a hop count can be obtained for various segments of the backbone network or for the entire backbone network. Finally, a hop count can be determined in a data center for packets arriving at a destination server computer. Similar hop counts can be determined for internal network traffic transmitted between data centers. The hop count can be used to determine how network expansion impacts services provided in the data center.

In one embodiment, agents executing on routers are used to transmit packet header data, including a TTL parameter, to a collector server computer. The collector server computer can discern signal (production flows) from noise (traceroutes and probing traffic), detecting packets that are at risk of being dropped due to TTL expiration. Alerts can be generated for packet flows with a dangerously low remaining TTL budget, which are at high risk of expiring due to operational events resulting in traffic temporarily traversing slightly longer paths. Source addresses can be identified for such packet flows and routers through which the packet flows are traversing can be identified. Hop counts can then be computed for different network segments, such as an Internet segment, a backbone segment and a data center segment.

Figure 1:
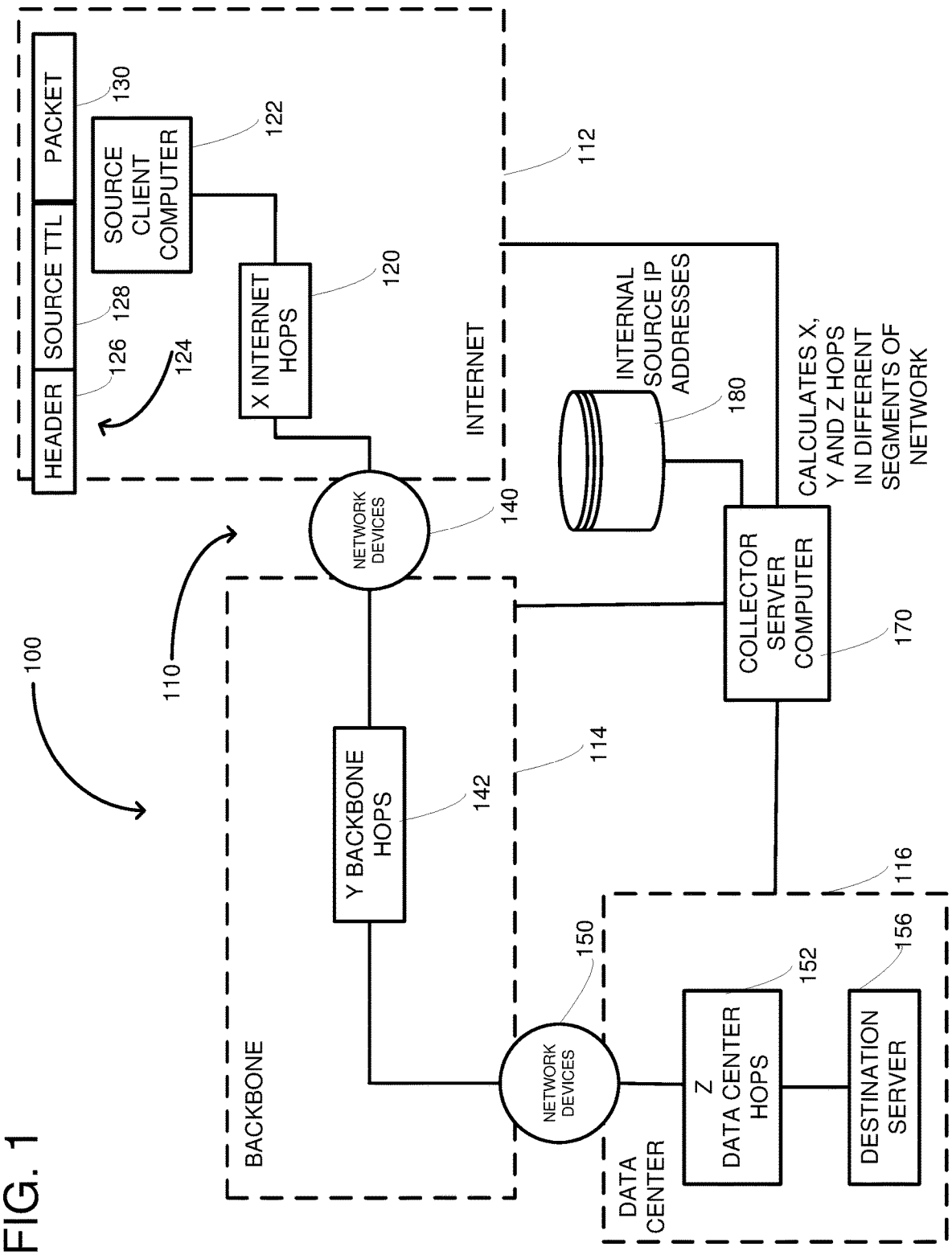
FIG. 1 shows a system diagram of a network logically divided into different segments, including an Internet segment, a backbone segment, and a data center segment, each of which has a hop count, which can be determined using a collector server computer.

FIG. 1 is a system 100 that includes a network 110 divided into network segments 112, 114, and 116. Network segment 112 is an Internet segment and is generally an unknown segment in terms of its topology and number of hops 120 (X). A source client computer 122 can transmit packets, such as packet 124, which includes a header 126, a source TTL parameter 128 (generally included in the header 126 but shown separately for purposes of illustration) and packet data 130. Network segment 114 is a backbone segment and is coupled to the Internet segment 112 through network devices 140. The network devices 140 can include one or more routers or switches that pass traffic between the Internet segment 112 and the backbone network segment 114. The network devices 140, 150 can be considered border routers that connect different network segments. The backbone network segment also includes a number of hops (Y), shown generally at 142. A plurality of network devices (not shown) can be included in the hops 142 and allow the transmission of network packets over large geographic areas, such as across or between countries. Network segment 116 is a data center segment and is coupled to the backbone segment by a network device 150. The data center segment 116 also has a number of hops (Z), shown at 152, coupled between the network device 150 and a destination server 156. The destination server computer 156 can receive packets from the source client computer 122 through the various network devices and hops in the network segments 112, 114, and 116. The number of hops in each segment generally differs and is shown as X, Y and Z for network segments 112, 114, and 116, respectively.

A collector server computer 170 is coupled to each of the network segments 112, 114, 116 and can compute the number of hops X, Y, Z, in each segment using an algorithm described herein. The algorithm uses the TTL value at different points in the network and computes how many hops packets have traversed using the TTL values. Additionally, time stamps can be saved in conjunction with the calculation of the hop counts in order to track how the number of network hops changes over time. In this way, when changes are made to the network, if packet failure is due to the TTL expiring, then analysis can be performed to determine which segment is problematic. In order to identify the network devices 140, 150, the collector server computer 170 can use source IP addresses found in a database 180. Using the source IP addresses, the collector server computer 170 can determine if the source client computer 122 is internal or external to a cloud provider network.

Figure 2:
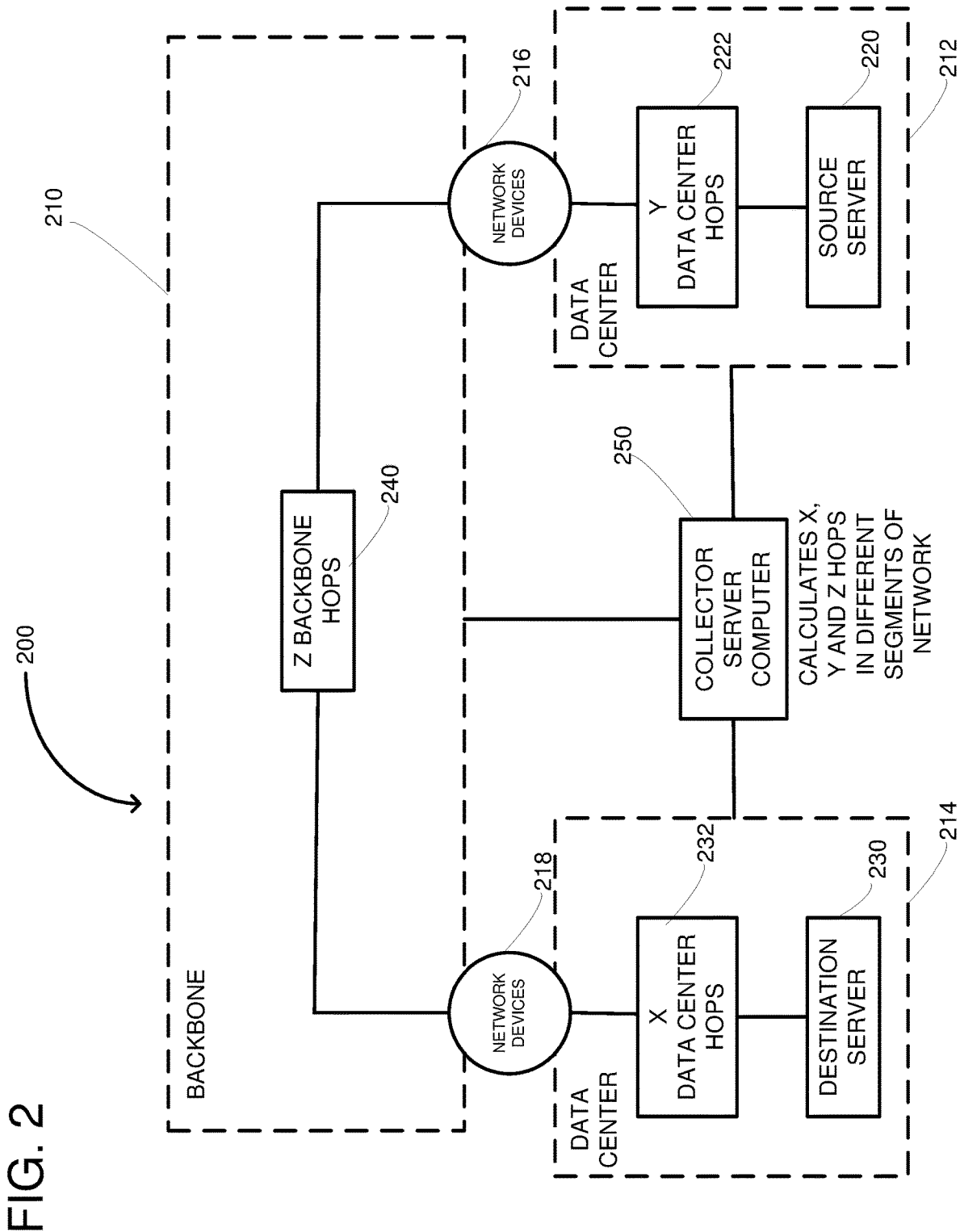
FIG. 2 shows a system diagram showing different network segments including a backbone segment and two different data center segments.

FIG. 2 is a system diagram 200 according to another embodiment wherein a backbone network 210 is coupled to different data centers 212, 214 via network devices 216, 218, respectively. The data center 212 is shown with a source server computer 220, which transmits packets through hops 222 (Y hops, where Y is any integer number), through the backbone network 210 (Z hops shown at 240, where Z is any integer number), to the data center 214 for receipt by a destination server 230 after traversing X data center hops (shown at 232, where X is any integer value). A collector server computer 250 can calculate the hops X, Y, and Z from the network segments 214, 212 and 210, respectively.

Figure 3:
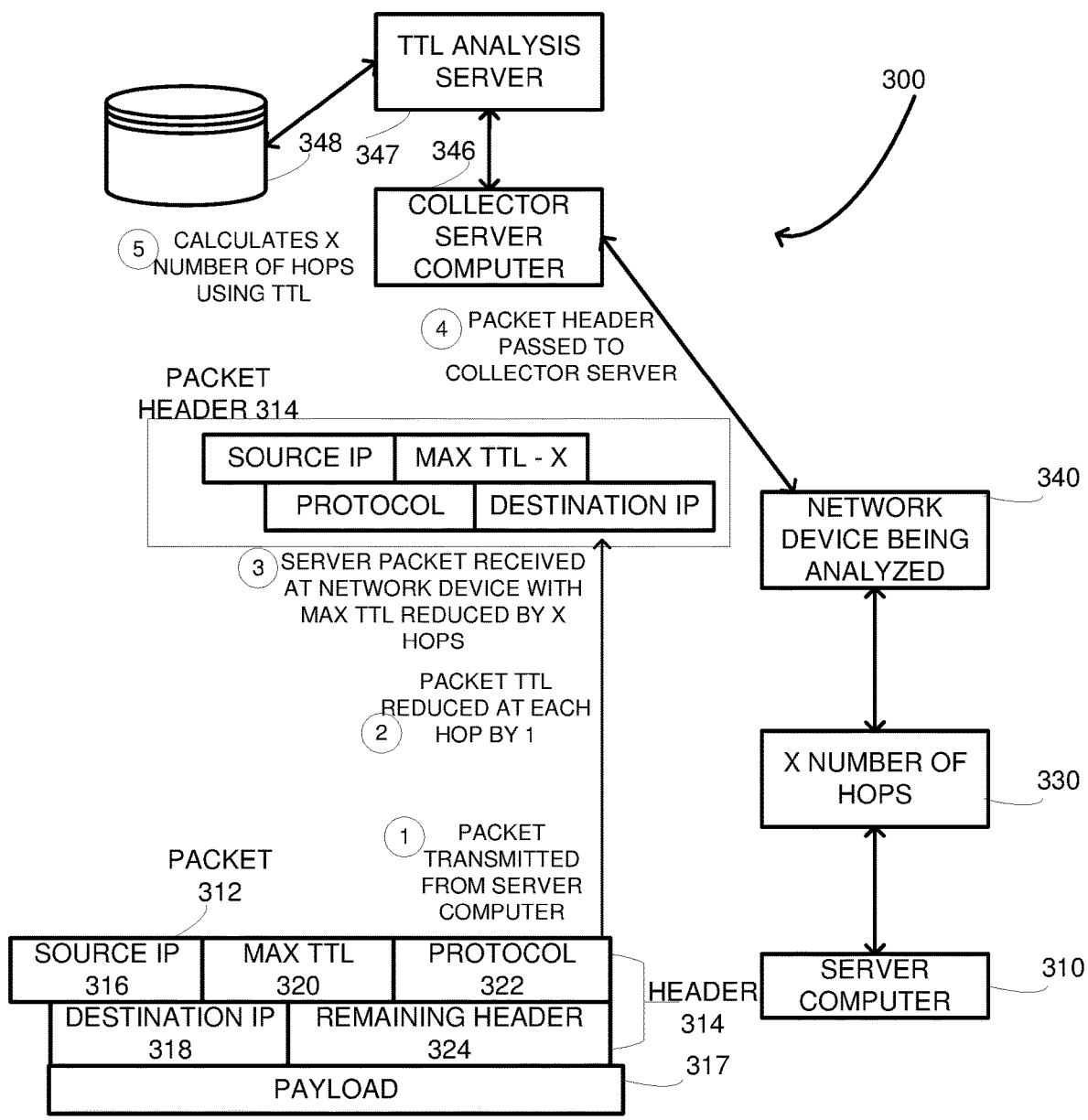
FIG. 3 shows an example of the collector server computer computing a hop count in a data center.
Figure 4:
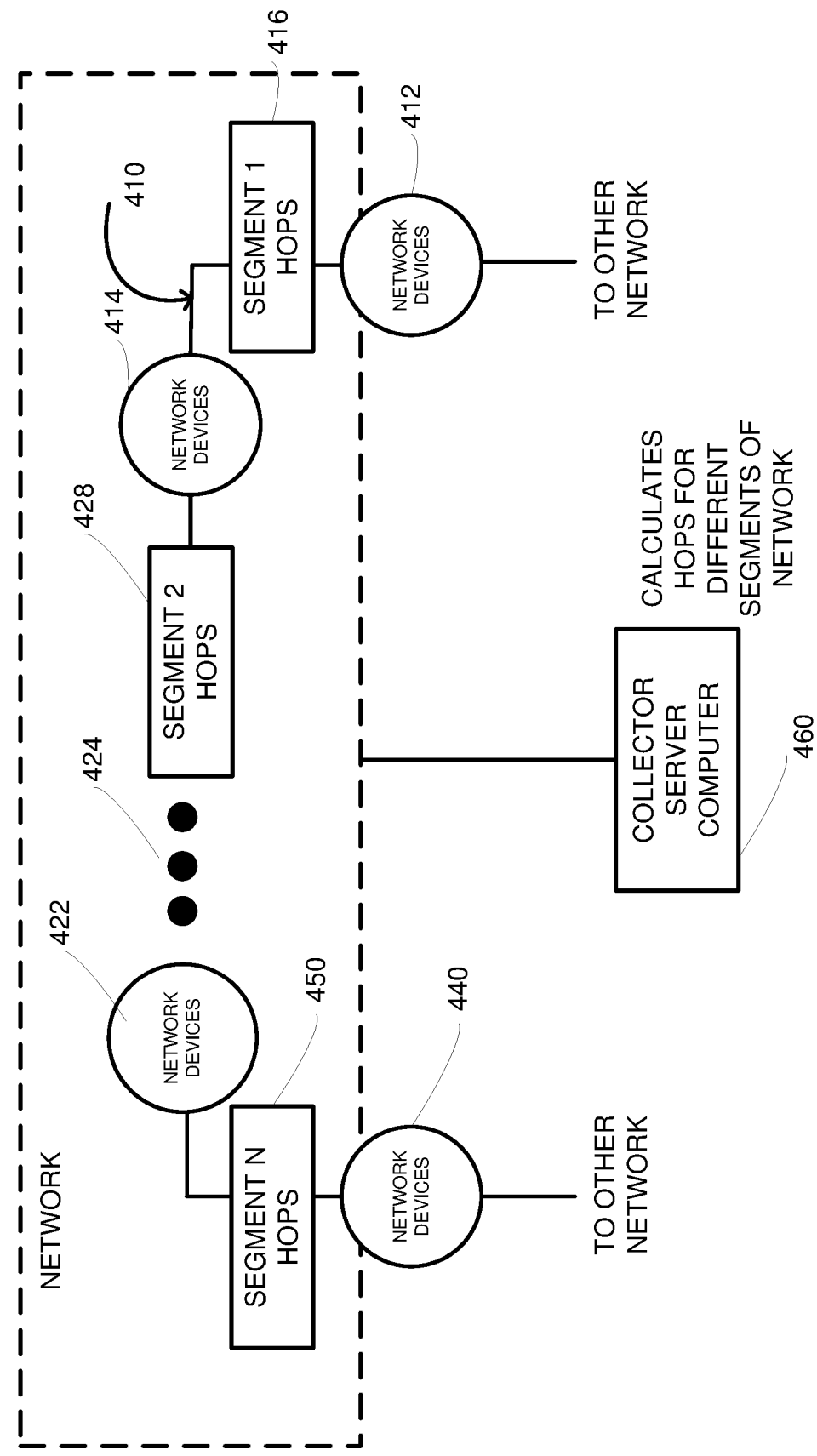
FIG. 4 shows a network with network devices forming multiple network segments with the collector server computer coupled to the network for determining hops in each of the network segments.

FIG. 3 is a diagram of a system 300 for determining the network hop count traversed by network traffic having a server computer 310 as a source address. In FIG. 3, a series of events are shown as numbered 1-5 in order of occurrence. At an event 1, a packet 312 is transmitted from the server computer 310. The packet 312 generally includes a header 314 and a payload 317. The header 314 can include multiple fields, such as a source IP address 316, a destination IP address 318, a TTL field 320, a protocol field 322 and other header fields 324. The TTL field 320 is set by the server computer 310 to a maximum and depends upon the operating system. Typically, the maximum TTL values are 64, 128 or 255. Other values can be used. The protocol field 322 relates to the type of protocol used. At an event 2, the packet 312 is transmitted through multiple hops 330 and at each hop, the TTL field 320 is reduced by 1. The hops 330 can be any network devices, such as switches (multilayer or single-layer), routers, repeaters, and gateways, for example. The hops 330 can also include any device used for forwarding packet data through a network. The hops 330 are generally coupled together by links (not shown) and can be any optical, or electrical cables for interconnecting network devices, such as Ethernet cables, or wireless connections. The number of hops through which the packet 312 traverses is designated as X and can be any integer value. At event 3, the server packet 312 is received at network device 340, which is the network device being analyzed. The network device 340 can be any of the network devices described above and can be the same type of device as the hops 330. As described further below, the network device 340 either randomly or periodically (e.g., fixed time intervals) analyzes packets and transmits select fields from the packet header 314 to a collector server computer 346, as shown at event 4. A TTL analysis server 347 can query the collector server computer 346 for packet header information. At event 5, the TTL analysis server computer 347 calculates the number of hops X using the current TTL. Specifically, the TTL analysis server 347 can make a determination of what is the maximum TTL as set by the server computer. Generally, this determination is accomplished by taking the current TTL received by the network device 340 and rounding up to the next higher number of 64, 128, or 255. The number of hops X is then calculated using a difference between the determined maximum TTL and the current TTL. A database 348 is coupled to the TTL analysis server 347 and can store the hops calculations for various server computers. Thus, in the present case, the source IP address 316 is stored in association with the computed value of X. In analyzing the packet header 314, the TTL analysis server 347 can analyze the protocol field 322, which may or may not be used. When analyzing the protocol field 322, the TTL analysis server 347 can filter out probe packets so that only actual network traffic is used. For example, the TTL analysis server 347 can use a signature of the packet header 314 to determine which packets are probes or test packets and which packets are actual traffic (e.g., client traffic). By performing filtering, the TTL analysis server 347 reduces the number of packets analyzed and removes unwanted noise from the TTL calculation. Although a separate TTL analysis server 347 is shown in this example, such analysis can be performed in the collector server computer 346, and other embodiments herein may show only the collector server computer for simplicity FIG. 4 shows another embodiment wherein a network 400 includes multiple network segments coupled between network devices. For example, a first segment 410 is coupled between network devices 412, 414 and includes L hops 416 (wherein L is any integer number). One or more additional network segments are coupled between network devices 414 and 422, as indicated by the dots 424. One of the network segments is shown having M hops as indicated at 428 (where M is any integer number). Yet another network segment is shown between network devices 422 and 440 and includes N hops 450 (where N is any integer number). A collector server computer 460 can calculate the hops L, M, and N for segments within the network 400. The collector server computer 460 can further sum the hops across the segments to compute the overall hops in the network. In one example, the network 400 can be a backbone network with the different segments forming the overall backbone network.

Figure 5:
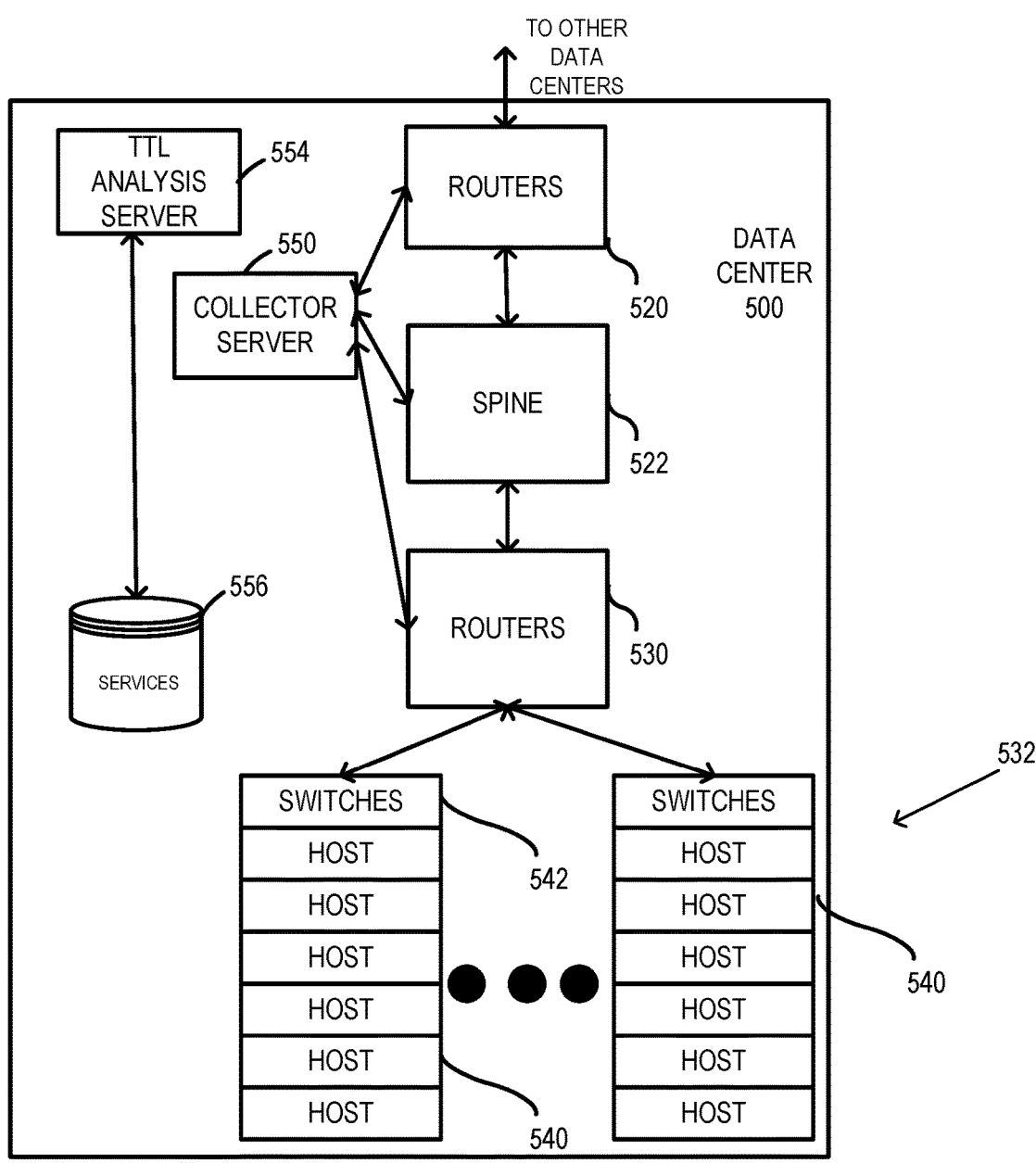
FIG. 5 shows an embodiment wherein the collector server computer is within a data center including multiple levels of routers.

FIG. 5 illustrates an embodiment of a data center 500 in which the local network managers can reside. The data center 500 includes various layers of routers, such as routers 520, 522, and 530. The routers 520 can be a border network, the routers 522 can be a spine network and the routers 530 can include different tiers of routers coupled to server computers, shown generally at 532. The routers 520 receive packets, read address information in a received packet and determine the packet's destination. If the routers 520 decide that a different data center contains a host server computer, then the packet is forwarded to that data center. If the packet is addressed to a host server computer in the data center 500, then it is passed through a layer of spine routers 522, and through any other layers of routers 530 to one or more racks of host server computers 540. Each rack 540 can include a switch 542 coupled to multiple host server computers. The routers can be in a spine-leaf configuration or other network architecture topologies. A collector server computer 550 can be coupled to any of the routers in the data center 500 and receives network packet header data, as described above. A TTL analysis server 554 can receive the header data and perform analysis on the header data to determine the number of hops to the server computers, as described above. A separate database 556 can include services available in the data center 500. For example, the services identified can be an association between offered services and server computers 540 that are used for those services. Different data centers (not shown) can have different collector server computers. The different collector server computers can cooperate together to share data related to services that span more than one data center. The TTL analysis server 554 can perform real-time hop calculations using the techniques described above.

Figure 6:
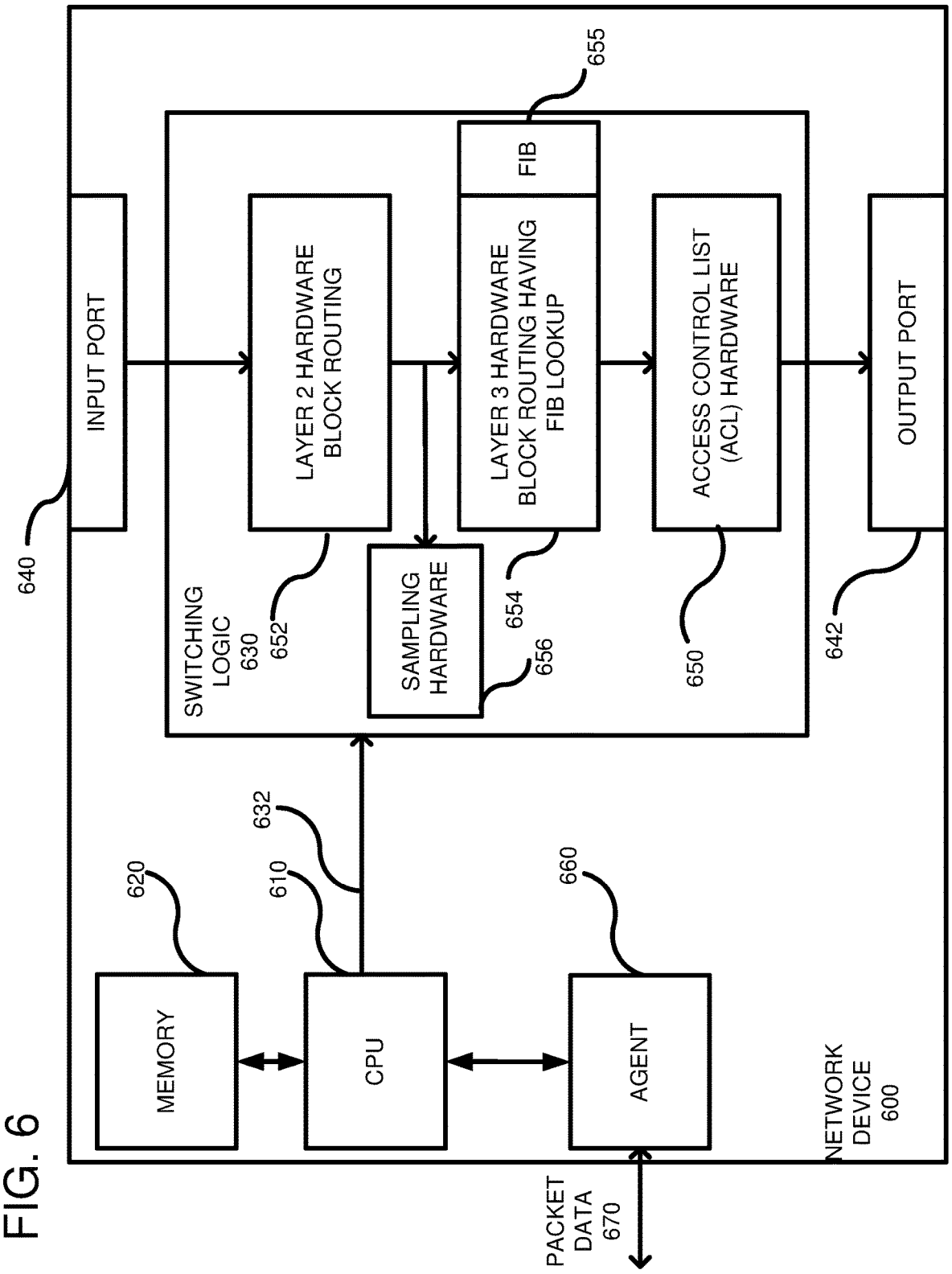
FIG. 6 is an example router that transmits packet headers to the collector server computer.

FIG. 6 shows a detailed example of an embodiment of the network device 600. Network device 600 is a switch that routes packets to a next hop in the network using a destination IP address. The network device 600 is an example of any of the hops shown in FIGS. 1-4. A CPU 610 is coupled to a memory 620 and to switching logic 630 through a bus 632 (PCIe or other protocols and bus types can be used). The switching logic 630 is positioned between an input port 640 and an output port 642, which are typically adapted to receive network cables, such as Ethernet cables. Although only one input port 640 and one output port 642 are shown, typically there are multiple ports (also called interfaces) on a network device. The switching logic 630 can be a single ASIC integrated circuit or divided into multiple integrated circuits. The switching logic 630 can include multiple different hardware logic blocks including a layer 2 hardware block 652, a layer 3 hardware block 654, and an Access Control List (ACL) hardware block 650. The layer 2 hardware block 652 relates to an Ethernet layer and can forward packets based on MAC tables. The layer 2 lookup ensures that an incoming packet's MAC address equals the MAC address of the network device 600. If so, then the packet can proceed onto the layer 3 hardware. If not, then the layer 3 lookup does not occur. The layer 3 hardware block 654 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a FIB 655, which includes destination addresses (e.g., prefixes) for packets being transmitted through the switching logic and associated ports for forwarding the packets. The network device 600 can run routing protocols, such as an Open Shortest Path First (OSPF) or a Routing Information Protocol (RIP), to communicate with other Layer 3 switches or routers. The routing tables are used to lookup the route for an incoming packet. The ACL block 650 relates to permissions and can include rules whether to drop packets. The different hardware blocks can be coupled in series and additional hardware blocks can be added based on the design. Packets pass from the input port 640 to the output port in accordance with the configuration of the hardware logic blocks 650, 652, 654, which are considered a switching pipeline. The input port 640, output port 642 and switching logic 630 can be considered a data plane or forwarding plane of the network device 600. By contrast, the CPU 610, memory 620, and an agent 660 are considered part of a control plane. Sampling hardware 656 can be provided anywhere in the switching pipeline and periodically (fixed time intervals) or randomly samples packets passing through the network device 600. The sampling hardware 656 is shown in between the layer 2 and layer 3 hardware but can be situated at other locations. As shown, the agent 660 can execute on the CPU 610 and can be used to receive sampled packets from the sampling hardware 656 and transmit packet header data to the collector, such as collector 346 (FIG. 3), as indicated at 670. The agent 660 can either strip the payload and only send the header data or can transmit the full packet to the collector server computer. The agent 660 can further add a timestamp to the packet. Although this embodiment shows the sampling hardware 656, the function of the sampling hardware can be performed in software, such as within the agent 660. Additionally, packets sent to the collector can be sampled using export technology (e.g., Netflow) or can be a copy of all packets (or just headers) traversing the network device interfaces using packet mirroring technology.

Figure 7:
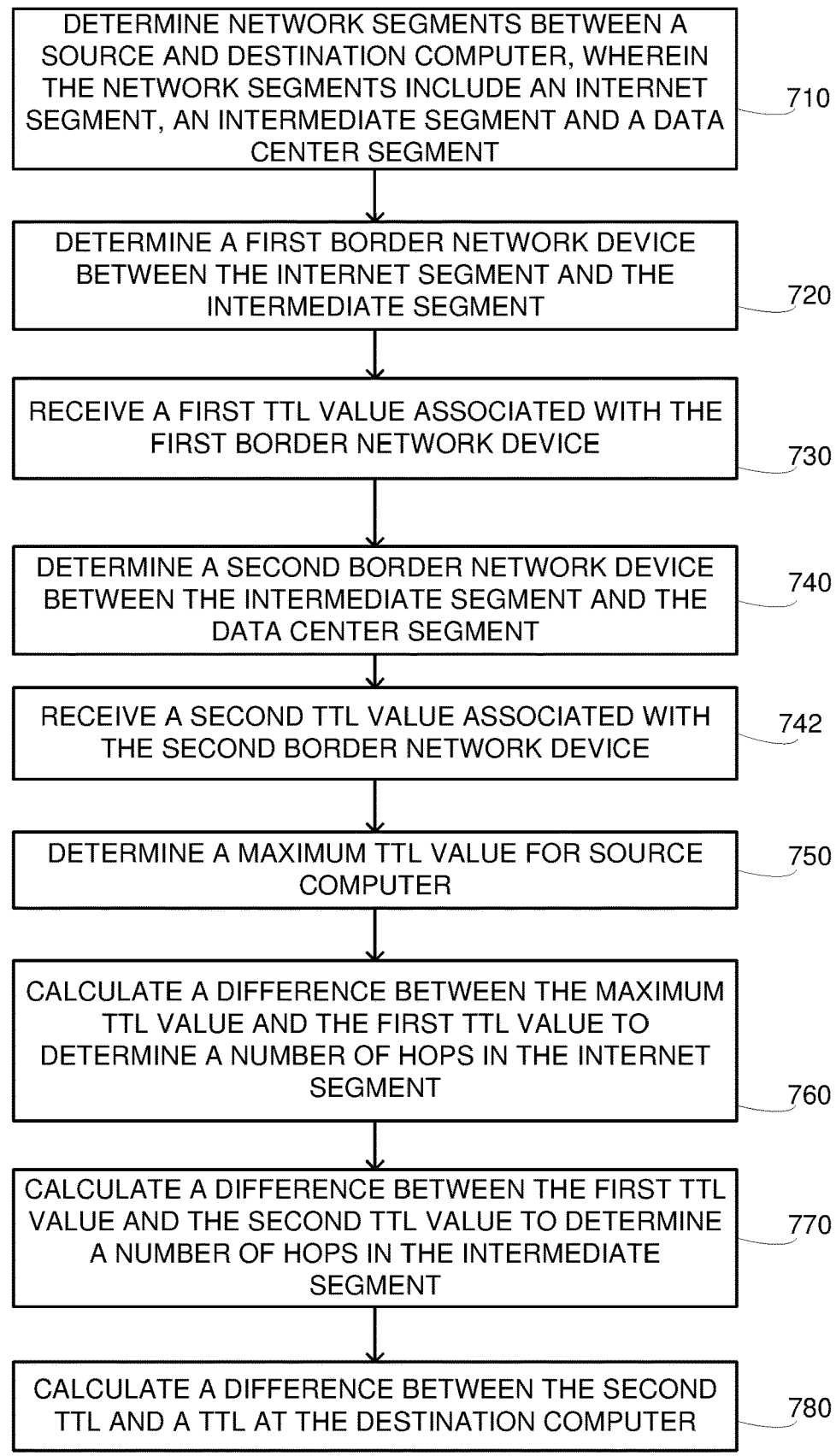
FIG. 7 is a flowchart according to one embodiment for calculating hops in different network segments of a network.

FIG. 7 is a flowchart according to another embodiment. In process block 710, a determination of network segments can be made by logically dividing the network into segments of different natures (e.g., different ownership or design) including an Internet segment, an intermediate segment (e.g., backbone segment) and a data center segment. In process block 720, a first device can be identified between the Internet segment and the intermediate segment. For example, in FIG. 1, the collector server computer 170 can identify the network device 140 as including one or more border routers for coupling the Internet segment 112 to the intermediate segment 114. In process block 730, a first TTL value associated with the first network device can be received. For example, the collector server computer 170 can receive the TTL value itself or a percentile (e.g., 90th percentile) of the TTLs associated with a packet stream from the source client computer 122. In process block 740, a second network device can be determined between the intermediate segment and the data center segment. For example, in FIG. 1, the collector server computer 170 can identify the network device 150 as being a second network device. Such information can be determined by stored topology data for the network (not shown). In process block 742, a second TTL value associated with the second network device can be determined in a similar way as process block 730. In process block 750, using the first TTL value, a maximum TTL value for the source computer can be determined. For example, a packet received from a server computer can be assumed to have only traversed a small number of hops (e.g., less than 20). In this way, the maximum TTL can be calculated through rounding up to known maximum settings used by server computers within the data center. Thus, the first TTL value can be rounded up to one of the following values: 64, 128 and 255. For example, a value of 100 is rounded up to 128 or a value of 131 is rounded up to 255. The number of hops is then computed using a difference between the selected maximum TTL and the first TTL (process block 760). In process block 770, a difference between the second TTL value and the first TTL value can be performed to determine the number of hops in the intermediate segment. Finally, in process block 780, a difference is calculated between the second TTL and a TTL at the destination computer. Alternatively, the hop count for the final segment can be known using the method described in FIG. 3, wherein the hop count is determined using reply packets from the destination computer towards the source computer. Thus, the calculated differences in process blocks 760, 770, and 780 provide a holistic view of the hop count of the network including total hops in each segment. Furthermore, the hops can be summed to provide a total hop count between the source and destination computers. The above process blocks can be performed in a different order. For example, low TTL packets can be received on border routers closest to the destination, and the low TTL values can be recorded. The border routers from which the low TTL traffic entered the network can be determined by searching the collector server database for all routers coupling the Internet segment to the intermediate segment for packets matching the low TTL traffic packet header. The TTL value can be recorded on network device 140. Then the maximum TTL value can be determined from the source computer. The differences described in process blocks 760, 770 can be calculated. Then process blocks 750, 760 can be repeated for network device 150.

Figure 8:
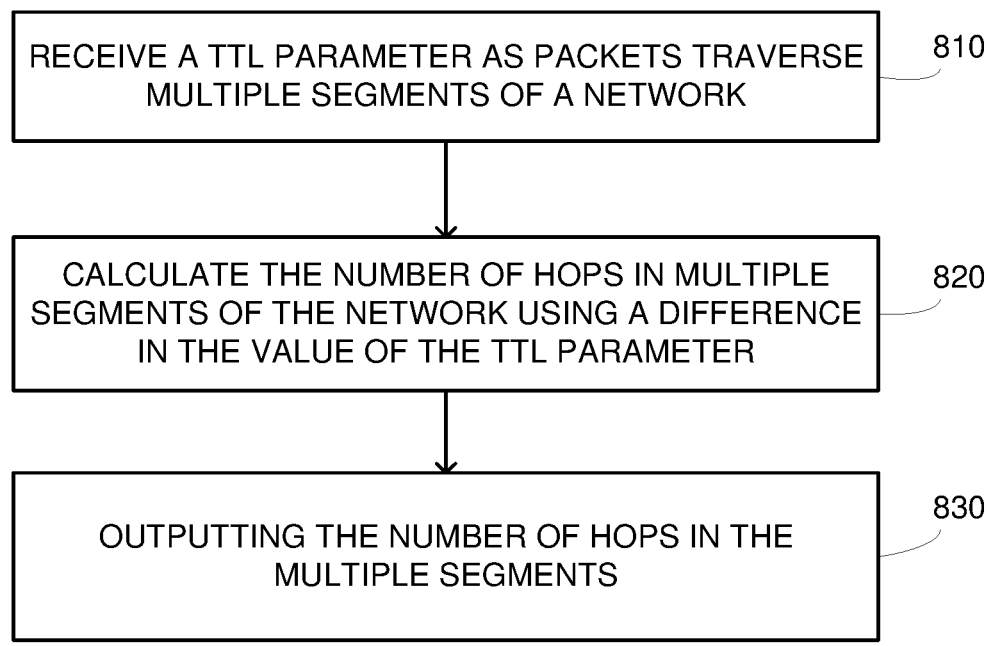
FIG. 8 is a flowchart according to another embodiment for calculating hops in different network segments of a network.

FIG. 8 is a flowchart according to another embodiment for determining a number of hops in different segments of a network. In process block 810, a TTL parameter is received as packets traverse multiple segments of a network. For example, in FIG. 2, a network device 216 can transmit a TTL parameter to the collector server computer 250. The TTL parameter can be the actual TTL value, an average of multiple TTLs, a percentile of multiple TTLs, a maximum, a minimum, etc. (any desired aggregation can be used) as computed by the network device using a plurality of packets having the same source/destination pairing. In one example, the CPU 610 (FIG. 6) can make such a computation of the TTL parameter based on samples received from the sampling hardware 656. In process block 820, a number of hops can be calculated in multiple segments of the network using a difference in the value of the TTL parameter. For example, returning to FIG. 2, the collector server computer 250 has not yet determined the number of hops 222, but the first value of the TTL parameter allows a logical assumption of the value of the TTL when the transmission was initiated at the source server 220. In particular, a rounding up of the TTL to known starting values of 64, 128 or 256 can be used with an assumption that the number of hops did not exceed 64. A difference can be calculated between the first value and the second value to determine a number of hops between the source computer and the first network device. For example, in FIG. 2, the number of hops 222 can be determined by using a difference between the TTL value received at the network device 216 and the rounded-up TTL or assumed starting TTL at the source server 220. A third TTL value can be received associated with the TTL parameter from a second network device. For example, in FIG. 2, as the packet continues its path from the source server 220, through the network device 216, it arrives at a second network device 218. The second network device 218 can transmit the TTL value to the collector server computer 250, wherein the TTL value can be computed similar to how the network device 216 computed the first TTL value. A difference can be calculated between the third TTL value and the second TTL value to determine a number of hops in the intermediate network. For example, in FIG. 2, the number of hops 240 can be computed by taking a difference in TTL values received from the network devices 218, 216. A number of hops 232 can be determined using the X data center hops, which was determined using, for example, the technique described in FIG. 3. Finally, at 830, an output can be generated including the number of hops in each of the multiple segments to obtain a holistic view of the network hops.

Figure 9:
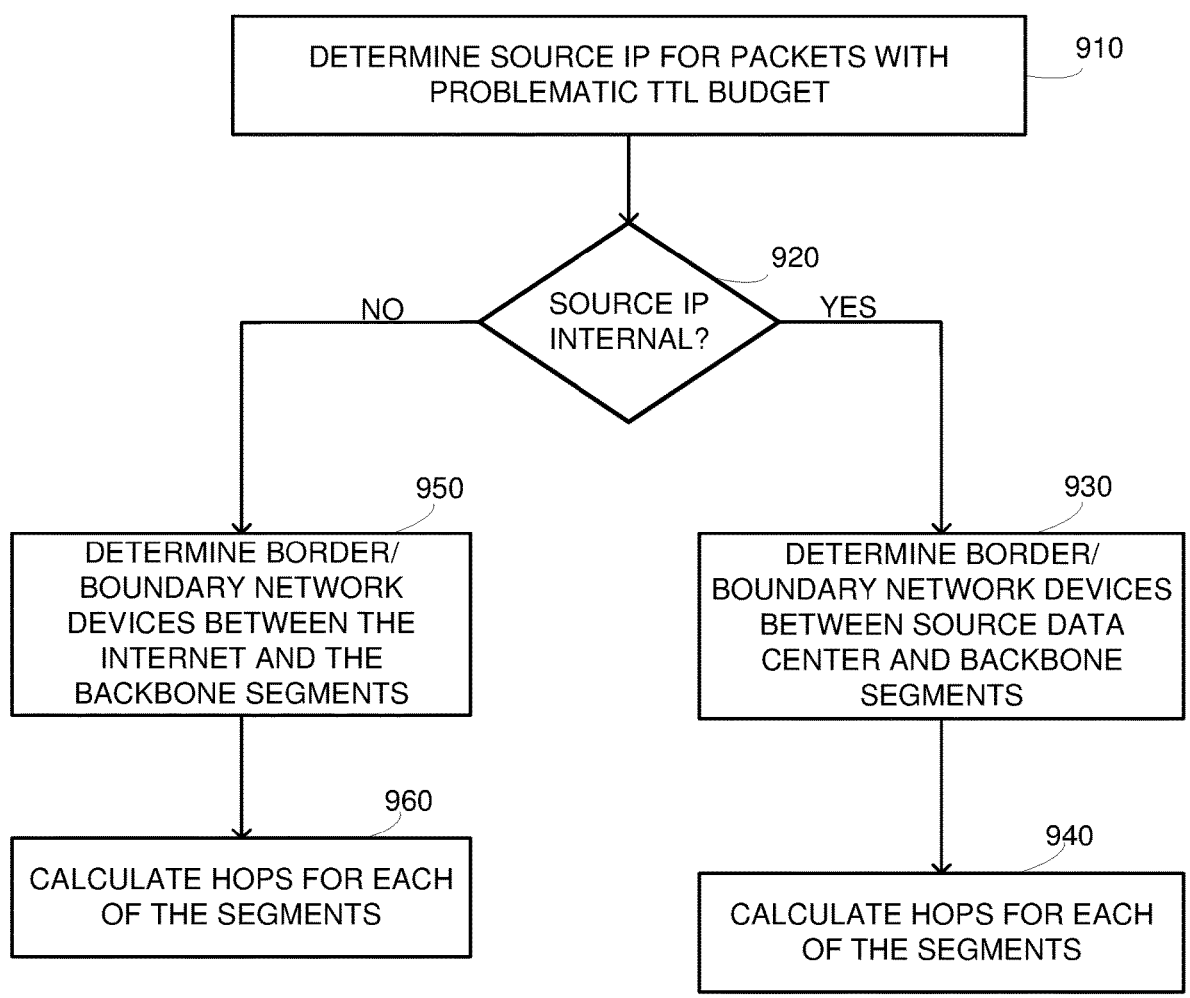
FIG. 9 is a flowchart according to another embodiment for determining a number of hops by deciding whether network packets are sourced internally or externally.

FIG. 9 is a flowchart according to another embodiment for determining a number of hops in different network segments. In process block 910, a source IP address is determined for packets with problematic TTL budgets. For example, packets that have expired due to the TTL value reaching a base value can be captured by the CPU 610 (FIG. 6) and transmitted to the collector server computer 170 (FIG. 1). The collector server computer 170 can use topology data to determine whether the source IP address is internal or external in decision block 920. For example, in FIG. 2, the system 200 can be controlled by a single cloud provider that can know the source IP address is with source server 220. On the other hand, if the source IP address is unknown to the cloud provider, the network structure can appear like FIG. 1, with the source client computer 122 being coupled through the Internet segment 112. If the source IP is internal, then in process block 930, border/boundary network devices are determined between the source data center and the backbone segments. For example, in FIG. 2, the network device 216 can be determined. TTL values received from the determined network devices can be received and processed to calculate the number of hops in each of the network segments using the techniques described above (process block 940). On the other hand, if decision block 920 is answered in the negative, then in process block 950, border/boundary network devices are determined between the Internet and backbone segments. For example, the network device 140 (FIG. 1) can be determined. Additionally, the network device 150 can be determined based upon the destination address. In process block 960, the hops can be calculated in each of the network segments using the techniques described above. Thus, using the flow of FIG. 9, a network structure can be identified using the source IP address, then network devices for the network structure can be determined. And, finally, a number of hops X, Y, and Z can be calculated for each of the network segments.

Figure 10:
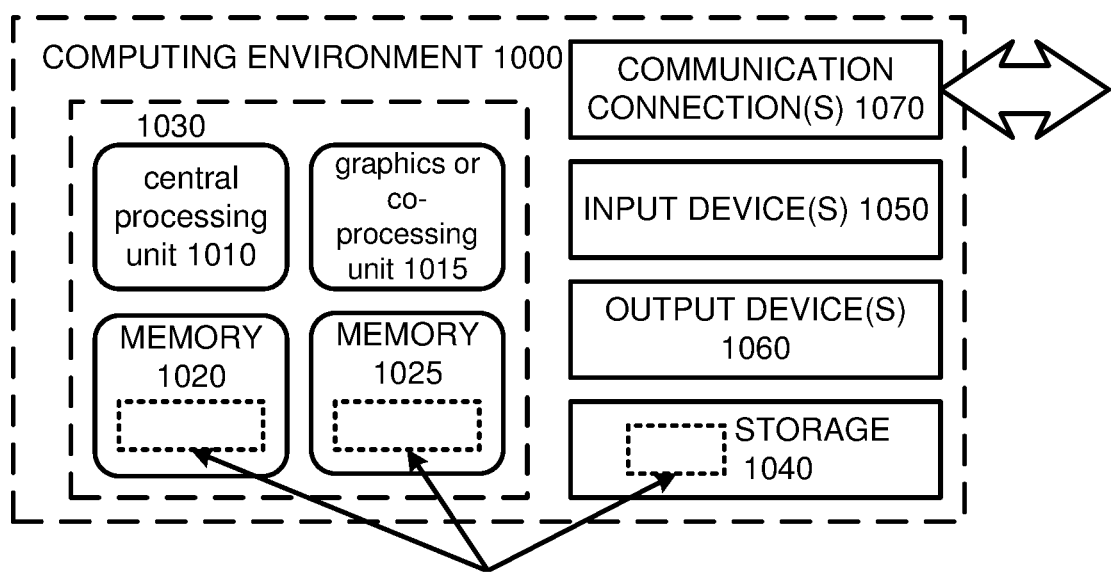
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). The computing environment 1000 can be used for the collector server computer described herein.

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of determining a hop count distribution in a network, the method comprising:
   determining network segments between a source computer and a destination computer in a network, wherein the network segments include an Internet segment, a data center segment, and at least one intermediate segment between the Internet segment and the data center segment;
   determining a first network device in the intermediate segment into which packets are being received from the source computer through the Internet segment;
   receiving a first time-to-live (TTL) value associated with the packets received in the first network device destined for the destination computer from the source computer;
   determining a second network device in the data center segment into which the packets are being received from the intermediate segment;
   receiving a second TTL value associated with the packets received in the second network device;
   determining a maximum TTL value for the packets as set by the source computer;
   calculating a difference between the maximum TTL value as set by the source computer and the first TTL value to obtain a number of hops in the Internet segment;
   calculating a difference between the first TTL value and the second TTL value to determine a number of hops in the intermediate segment; and
   calculating a difference between the second TTL and a third TTL at the destination computer to determine a number of hops in the data center segment so that the number of hops in the Internet segment, intermediate segment, and data center segment are determined.

2. The method of claim 1, wherein the destination computer is a first server computer of a plurality of server computers that cooperatively operate a service in the data center.

3. The method of claim 1, further including storing at least the first and second TTL values in association with a time stamp to analyze how the TTL values change with time following changes in the network hop count.

4. The method of claim 1, wherein the first TTL value is a percentile value associated with a plurality of TTL values.

5. The method of claim 1, further including intercepting network packets at fixed time intervals and transmitting packet headers including TTL values and a destination server computer address to a collector server computer.

6. A method, comprising:
   receiving a Time-To-Live (TTL) parameter associated with one or more packets as the one or packets traverse multiple segments of a network between a source computer and a destination computer, wherein the multiple segments of the network are coupled together by network devices;
   calculating a number of hops in the multiple segments of the network using a difference of values of the TTL parameter received from the network devices;
   outputting the number of hops in the multiple segments to provide a number of hops in the network; and
   determining whether the source computer is connected to a backbone network through an Internet connection or through a datacenter connection by performing a search in a database that includes internal addresses.

7. The method of claim 6, wherein a network segment between the source computer and a first of the network devices is an Internet segment and the first network device couples the Internet segment to a backbone segment and a second of the network devices couples the backbone segment to a datacenter segment, and wherein the number of hops in the multiple segments includes the number of hops in the Internet segment, the backbone segment and the datacenter segment.

8. The method of claim 7, further including determining a first value of the TTL parameter using a percentile of the one or more packets received from the first network device and determining a second value of the TTL parameter by rounding up the first value to one of three candidate maximum values including 64, 128, and 255.

9. The method of claim 6, wherein a network segment between the source computer and a first of the network devices is within a first datacenter, the first network device couples the first datacenter to a backbone network, and a second of the network devices couples the backbone network to a second datacenter.

10. The method of claim 6, further including identifying a first of the network devices based upon the determination whether the source computer is connected to the backbone network through the Internet connection or through the datacenter connection.

11. The method of claim 6, wherein a first value is computed using a percentile value for a plurality of the packets at a first of the network devices and a second value is computed using the percentile for the plurality of the packets at a second of the network devices.

12. The method of claim 6, further including transmitting hop counts for display including a number of hops in each of the network segments between the source computer and the destination computer.

13. The method of claim 6, wherein the network devices periodically collect packet information and transmit the packet information to a collector server computer, wherein the packet information includes a source address, a destination address, a protocol, and the TTL parameter.

14. A system, comprising:
   a plurality of network segments coupled together by network devices, wherein a source computer is within a first network segment of the plurality of network segments, a destination computer is within a second network segment of the plurality of network segments, and an intermediate network segment of the plurality of network segments is positioned between the first and second network segments; and
   a collector server computer coupled to the network devices and configured to receive packet header data for packets transmitted through the network devices, the collector server computer further configured to calculate a number of hops between the network devices using Time-To-Live (TTL) values received from the network devices to determine a hop count in the plurality of network segments;
   wherein the first network segment is an Internet segment or a source data center, the second network segment is a destination data center segment, and the intermediate segment is a backbone segment.

15. The system of claim 14, wherein the collector server computer is coupled to a database including IP addresses that are internal to a cloud provider, and wherein the collector server computer is configured to search the IP addresses to determine if the source computer is internal or external to the cloud provider.

16. The system of claim 15, wherein the collector server computer is further configured to store the number of hops in the plurality of network segments in association with time stamps.

17. The system of claim 16, wherein the collector server computer is further configured to determine whether the source computer is one of a plurality of server computers that offer a same service and to determine whether increasing the number of hops through the backbone will impact dropped packets associated with the service.

18. The system of claim 14, wherein the collector server computer is configured to round up a received TTL value associated with a packet received from the destination computer to a source TTL value of 64, 128, or 255 and use the rounded-up TTL value as the TTL value at the destination computer.

\* \* \* \* \*